United States Patent
Kameda et al.

(10) Patent No.: US 12,158,195 B2
(45) Date of Patent: Dec. 3, 2024

(54) REDUCTION GEAR

(71) Applicant: NITTAN VALVE CO., LTD., Hadano (JP)

(72) Inventors: Michihiro Kameda, Hadano (JP); Yasuhiro Horiuchi, Hadano (JP)

(73) Assignee: NITTAN CORPORATION, Hadano (JP)

( * ) Notice: Subject to any disclaimer, the term of this patent is extended or adjusted under 35 U.S.C. 154(b) by 905 days.

(21) Appl. No.: 17/273,501

(22) PCT Filed: Aug. 2, 2019

(86) PCT No.: PCT/JP2019/030532
§ 371 (c)(1),
(2) Date: Mar. 4, 2021

(87) PCT Pub. No.: WO2021/024312
PCT Pub. Date: Jan. 11, 2021

(65) Prior Publication Data
US 2021/0207685 A1    Jul. 8, 2021

(51) Int. Cl.
*F16H 1/32* (2006.01)
*B60K 17/04* (2006.01)
*B60K 7/00* (2006.01)

(52) U.S. Cl.
CPC ............. *F16H 1/32* (2013.01); *B60K 17/046* (2013.01); *F16H 1/321* (2013.01); *B60K 7/0007* (2013.01); *B60K 2007/0092* (2013.01)

(58) Field of Classification Search
CPC ...... F16H 1/32; F16H 1/321; F16H 2001/323; F16H 23/10
See application file for complete search history.

(56) References Cited

U.S. PATENT DOCUMENTS

| 2,704,459 | A | * | 3/1955 | Nanni | ...................... F16H 1/32 475/168 |
| 3,881,363 | A | * | 5/1975 | Takasu | ...................... F16H 1/32 74/63 |

(Continued)

FOREIGN PATENT DOCUMENTS

| JP | S52-47162 A | 4/1977 |
| JP | S59-183144 A | 10/1984 |

(Continued)

OTHER PUBLICATIONS

International Search Report mailed Sep. 24, 2019, issued for PCT/JP2019/030532.

*Primary Examiner* — Bobby Rushing, Jr.
(74) *Attorney, Agent, or Firm* — Locke Lord LLP

(57) ABSTRACT

A reduction gear W1 that is configured to reduce a rotation speed input to an input shaft 1, and output the reduced rotation speed from an output shaft, the reduction gear including: an inner trochoid 8 that has a wavy curved surface formed on an inner circumferential side surface thereof; an inner trochoid holder 9 that is designed to hold the inner trochoid 8; an outer trochoid 3 that has a wavy curved surface formed on an outer circumferential side surface thereof; a rotation restriction unit that is designed to restrict rotation of the outer trochoid 3 around an axis thereof; and an output pin 9 that is pinched between the outer circumferential side surface of the outer trochoid 3 and the inner circumferential side surface of the inner trochoid 8.

1 Claim, 8 Drawing Sheets

(56) References Cited

U.S. PATENT DOCUMENTS 7,147,582 B2 * 12/2006 Mingishi .................. F16H 1/32
                                                                         475/171
2011/0319217 A1 * 12/2011 Imase ...................... F16H 1/32
                                                                         475/168

FOREIGN PATENT DOCUMENTS

| JP | H06-71942 U | 10/1994 | | |
|----|----|----|----|----|
| JP | 5010484 B2 | 8/2012 | | |
| WO | WO-2011001802 A1 * | 1/2011 | ............... | F16H 1/32 |
| WO | WO-2019022147 A1 * | 1/2019 | ............... | F16H 1/32 |

* cited by examiner

REDUCTION GEAR

TECHNICAL FIELD

The present invention relates to a reduction gear that is configured to reduce a rotation speed input to an input shaft, and output the reduced rotation speed from an output shaft.

BACKGROUND ART

Heretofore, there is known a cycloid reduction gear which is installed between an electric motor and a wheel hub bearing portion, and configured to reduce the rotation speed of the motor and transmit the reduced rotation speed to the wheel hub bearing. For example, PTL 1 discloses the configuration of the cycloid reduction gear described above.

The cycloid reduction gear described in PTL 1 includes: a motor-side rotation member (input-side rotation member) in which eccentric portions are formed; a wheel-side rotation member (output-side rotation member); and curve plates (revolution member) which are rotatably held by the eccentric portions and designed to perform revolution movement around the rotation axis center of the motor-side rotation member along with the rotation of the motor-side rotation member.

In addition, the cycloid reduction gear includes: outer pins (multiple outer pins) which engage with outer circumferential portions of the above curve plates to make the curve plates perform rotation movement around their axes; and a conversion mechanism which is configured to convert the rotation movement of the curve plates around their axes described above into rotation movement around the rotation axis center and transmit the converted rotation movement to the output-side rotation member. The above conversion mechanism is constituted of: inner pins (multiple inner pins) which are arranged on a circumferential trajectory around the rotation axis center of the wheel-side rotation member; and through holes (multiple through holes) which are formed in the above curve plates and into which the inner pins are inserted. Here, the through holes formed in the curve plates each have a larger diameter by a predetermined size than the outer diameter of each inner pin. In addition, the multiple inner pins each have one end in its axial direction secured to the wheel-side rotation member. Further, the wheel-side rotation member is coupled and secured to the wheel hub bearing portion.

In the cycloid reduction gear described above, when the motor is driven to rotate the motor-side rotation member, the curve plates perform revolution movement around the rotation axis center of the motor-side rotation member. In this event, the outer pins engage with the curve waveforms of the curve plates to make the curve plates rotate around their axes in the opposite direction to the rotation of the motor-side rotation member. In addition, the inner pins inserted into the through holes are brought into contact with the inner wall surfaces of the through holes along with the rotation movement of the curve plates around their axes. Thereby, no revolution movement of the curve plates is transmitted to the inner pins, and only the rotation movement of the curve plates around their axes is transmitted to the wheel hub bearing portion through the wheel-side rotation member.

With this configuration, the rotation of the motor-side rotation member is reduced in speed and transmitted to the wheel-side rotation member.

CITATION LIST

Patent Literature

PTL 1: JP5010484

SUMMARY OF INVENTION

Technical Problem

However, for the cycloid reduction gear described in PTL 1 described above, the outer pins, the curve plates, and the inner pins for output that are inserted into the holes formed in the curve plates are essential parts. For this reason, this cycloid reduction gear has such a technical problem that its structure results in a large outer diameter size.

The present invention has been made in view of the above problem, and aims to provide a reduction gear that is compact in outer diameter size.

Solution to Problem

An aspect of the present invention for solving the above technical problem is a reduction gear that is configured to reduce a rotation speed input to an input shaft provided with an eccentric portion, and output the reduced rotation speed from an output shaft, the reduction gear being characterized by including: an inner trochoid that has a substantially tubular shape penetrating at both ends thereof and has a wavy curved surface formed on an inner circumferential side surface thereof; an inner trochoid holder that is designed to hold the inner trochoid; an outer trochoid that is disposed inside the tubular inner trochoid, has a substantially tubular shape penetrating at both ends thereof, and has a wavy curved surface formed on an outer circumferential side surface thereof; a rotation restriction unit that is designed to restrict rotation of the outer trochoid around an axis thereof; and an output pin that is pinched between the outer circumferential side surface of the outer trochoid and the inner circumferential side surface of the inner trochoid, characterized in that the outer trochoid is connected to the eccentric portion of the input shaft and, when the input shaft rotates, the outer trochoid receives eccentric input from the input shaft and at the same time the rotation around the axis thereof is restricted by the rotation restriction unit, which makes the outer trochoid only revolve around an axis of rotation of the input shaft, when the input shaft rotates, the inner trochoid holder transmits eccentric input generated by the rotation of the input shaft to the inner trochoid to make the inner trochoid revolve around the axis of rotation of the input shaft and at the same time to make the inner trochoid rotate around an axis thereof in the same direction as a direction of the rotation of the input shaft, and the output pin has one end secured to the output shaft and, in response to the outer trochoid's revolution around the axis of rotation of the input shaft and the inner trochoid's revolution around the axis of rotation of the input shaft and rotation around the axis thereof, the output pin is made to revolve around the axis of the input shaft in the same direction as the direction of rotation of the input shaft to thereby rotate the output shaft in the same direction as the direction of rotation of the input shaft.

In this way, the reduction gear according to the first aspect of the present invention includes: the outer trochoid; the inner trochoid; and the output pin that is pinched between the outer circumferential side surface of the outer trochoid and the inner circumferential side surface of the inner trochoid. In addition, both the outer trochoid and the inner trochoid are designed to operate in the reduction gear of the first aspect. With this configuration, the "outer pins and inner pins" that are essential for the cycloid reduction gear of the existing technique can be replaced simply by the output pins (the output pins can also function as the "outer pins and inner pins" of the existing technique), thereby implementing a reduction in outer diameter size of the reduction gear as compared to that of the existing technique.

In addition, due to such a configuration that both the outer trochoid and the inner trochoid are designed to operate, the reduction gear according to the first aspect of the present invention can achieve a larger meshing ratio than the cycloid reduction gear of the existing technique, thus implementing smoother driving.

Further, in the reduction gear according to the first aspect of the present invention, in response to the outer trochoid's revolution around the axis of rotation of the input shaft and the inner trochoid's revolution around the axis of rotation of the input shaft and rotation around its axis, the output pins are made to revolve around the axis of rotation of the input shaft in the same direction as the direction of rotation of the input shaft, to thereby rotate the output shaft in the same direction as the direction of rotation of the input shaft.

According to the above configuration, in the case of using an input made from the output shaft side, the direction of rotation of the outer trochoid is the same as the direction of rotation of the input made from the output shaft side, and thus the input shaft also rotates in the same direction. In other words, the configuration of the present invention enables an input from the output shaft side, and is therefore effective in the case of performing regeneration of power such as in a drive system of an electric vehicle.

On the other hand, since the cycloid reduction gear of the existing technique described above has such a configuration that the direction of rotation of an input made to the input shaft is opposite to the direction of rotation of the output shaft, this reduction gear has a problem in that it results in extremely poor efficiency when an input is made from the output shaft side.

Meanwhile, a second aspect of the present invention is a reduction gear that is configured to reduce a rotation speed input to an input shaft provided with an eccentric portion, and output the reduced rotation speed from an output shaft, the reduction gear being characterized by including: an inner trochoid that has a substantially tubular shape penetrating at both ends thereof and has a wavy curved surface formed on an inner circumferential side surface thereof; an inner trochoid holder that is designed to hold the inner trochoid; an outer trochoid that is disposed inside the tubular inner trochoid, has a substantially tubular shape penetrating at both ends thereof, and has a wavy curved surface formed on an outer circumferential side surface thereof; and an output pin that is pinched between the outer circumferential side surface of the outer trochoid and the inner circumferential side surface of the inner trochoid, characterized in that the inner trochoid holder is provided with a rotation restriction unit that is designed to restrict rotation of the inner trochoid around an axis thereof, the outer trochoid is connected to the eccentric portion of the input shaft and, when the input shaft rotates, the outer trochoid receives eccentric input from the input shaft, and thus revolves around an axis of rotation of the input shaft and at the same time rotates around an axis thereof in the opposite direction to a direction of the rotation of the input shaft, when the input shaft rotates, the inner trochoid holder transmits eccentric input generated by the rotation of the input shaft to the inner trochoid to make the inner trochoid revolve around the axis of rotation of the input shaft without rotating around the axis thereof, and the output pin has one end secured to the output shaft and, in response to the outer trochoid's revolution around the axis of rotation of the input shaft and rotation around the axis thereof and the inner trochoid's revolution around the axis of rotation of the input shaft, the output pin is made to revolve around the axis of the input shaft in the opposite direction to the direction of rotation of the input shaft to thereby rotate the output shaft in the opposite direction to the direction of rotation of the input shaft.

In the reduction gear according to the second aspect of the present invention, as in the case of the first aspect, both the outer trochoid and the inner trochoid are designed to operate. With this configuration, the "outer pins and inner pins" that are essential for the cycloid reduction gear of the existing technique can be replaced simply by the output pins (the output pins can also function as the "outer pins and inner pins" of the existing technique), thereby implementing a reduction in outer diameter size of the reduction gear as compared to that of the existing technique. In addition, as in the case of the first aspect, due to such a configuration that both the outer trochoid and the inner trochoid are designed to operate, the reduction gear according to the second aspect of the present invention can achieve a larger meshing ratio than the cycloid reduction gear of the existing technique, thus implementing smoother driving.

In addition, it is preferable that the number of the output pins provided is n, the wavy curved surface on the outer circumferential side surface of the outer trochoid has n−1 arc-shaped waveforms, and the wavy curved surface on the inner circumferential side surface of the inner trochoid has n+1 arc-shaped waveforms (n≥4).

It is also preferable that the input shaft is rotated by driving of a motor, and the output shaft has one end secured to a hub of a vehicle wheel and is thereby designed to rotate the vehicle wheel.

Further, it is preferable that the wavy curved surface on the inner circumferential side surface of the inner trochoid is formed to have a tapered shape tapered in the opposite direction to that of the wavy curved surface on the outer circumferential side surface of the outer trochoid, and the output pin has a tapered shape fitted to the tapered shapes of the inner trochoid and the outer trochoid.

With this configuration, backlash is adjusted.

Furthermore, it is preferable that the output pin has a crowning formed in a portion in contact with the inner trochoid and the outer trochoid.

This configuration makes it possible to prevent each output pin from wearing at both ends of its contact surface with the trochoid parts (the inner trochoid and the outer trochoid).

Meanwhile, a third aspect of the present invention is a reduction gear that is configured to reduce a rotation speed input to an input shaft provided with an eccentric portion, and output the reduced rotation speed from an output shaft, the reduction gear being characterized by including: an outer trochoid that has a substantially tubular shape penetrating at both ends thereof and has a wavy curved surface formed on an outer circumferential side surface thereof; a rotation restriction unit that is designed to restrict rotation of the outer trochoid around an axis thereof; and an output pin that is held by the outer trochoid while being in contact with the outer circumferential side surface of the outer trochoid, characterized in that the outer trochoid is connected to the eccentric portion of the input shaft and, when the input shaft rotates, the outer trochoid receives eccentric input from the input shaft and at the same time the rotation around the axis thereof is restricted by the rotation restriction unit, which makes the outer trochoid only revolve around an axis of rotation of the input shaft, and the output pin has one end secured to the output shaft and, in response to the outer trochoid's revolution around the axis of rotation of the input shaft, the output pin is made to revolve around the axis of the input shaft in the same direction as the direction of rotation of the input shaft while being in contact with the outer circumferential surface of the outer trochoid to thereby rotate the output shaft in the same direction as the direction of rotation of the input shaft.

As in the case of the first and second aspects described above, the reduction gear according to the third aspect of the present invention has such a configuration that the "outer pins and inner pins" that are essential for the cycloid reduction gear of the existing technique can be replaced simply by the output pins 6, thereby implementing a reduction in size of the reduction gear as compared to that of the existing technique.

Note that, since the reduction gear of the third aspect is not provided with "the inner trochoid and the inner trochoid holder" that are provided in the first and second aspects described above, this implements the reduction gear 3 that is smaller in size than those of the first and second aspects. In addition, this configuration implements a reduction in the number of parts as compared to those of the first and second aspects, and thus implements a cost reduction.

In addition, the reduction gear according to the above third aspect may have such a configuration that a ring-shaped part that is designed to be in contact with the output pin is provided at a position on one side of the output pin opposite to a side where the output pin is in contact with the outer circumferential side surface of the outer trochoid, and the output pin is pinched between the outer circumferential side surface of the outer trochoid and an inner circumferential side surface of the ring-shaped member.

This configuration can act on the output pins, which are held by the outer trochoid while being in contact with the outer circumferential side surface (the wavy curved surface) of the outer trochoid, in such a way as to prevent the output pins being applied with a load from being deformed and prevent them from wearing due to reasons such as uneven loading.

Meanwhile, a fourth aspect of the present invention is a reduction gear that is configured to reduce a rotation speed input to an input shaft provided with an eccentric portion, and output the reduced rotation speed from an output shaft, the reduction gear being characterized by including: an inner trochoid that has a substantially tubular shape penetrating at both ends thereof and has a wavy curved surface formed on an inner circumferential side surface thereof; an inner trochoid holder that is designed to hold the inner trochoid; and an output pin that is held by the inner trochoid while being in contact with the inner circumferential side surface of the inner trochoid, characterized in that the inner trochoid holder is provided with a rotation restriction unit that is designed to restrict rotation of the inner trochoid around an axis thereof and, when the input shaft rotates, the inner trochoid holder transmits eccentric input generated by the rotation of the input shaft to the inner trochoid to make the inner trochoid revolve around an axis of rotation of the input shaft without rotating around the axis thereof, and the output pin has one end secured to the output shaft and, in response to the inner trochoid's revolution around the axis of rotation of the input shaft, the output pin is made to revolve around the axis of the input shaft in the opposite direction to the direction of rotation of the input shaft while being in contact with the inner circumferential side surface of the inner trochoid to thereby rotate the output shaft in the opposite direction to the direction of rotation of the input shaft.

As in the case of the first and second aspects described above, the reduction gear according to the fourth aspect of the present invention has such a configuration that the "outer pins and inner pins" that are essential for the cycloid reduction gear of the existing technique can be replaced simply by the output pins 6, thereby implementing a reduction in size of the reduction gear as compared to that of the existing technique.

Note that, since the reduction gear of the fourth aspect is not provided with "the outer trochoid" that is provided in the first and second aspects, this implements a reduction in the number of parts as compared to those of the first and second aspects, and thus implements a cost reduction.

In addition, the reduction gear according to the above fourth aspect may have such a configuration that a ring-shaped part that is designed to be in contact with the output pin is provided at a position on one side of the output pin opposite to a side where the output pin is in contact with the inner circumferential side surface of the inner trochoid, and the output pin is pinched between the inner circumferential side surface of the inner trochoid and an outer circumferential side surface of the ring-shaped member.

This configuration can act on the output pins, which are held by the inner trochoid while being in contact with the inner circumferential side surface (the wavy curved surface) of the inner trochoid, in such a way as to prevent the output pins being applied with a load from being deformed and prevent them from wearing due to reasons such as uneven loading.

Advantageous Effects of Invention

According to the present invention, it is possible to provide a cycloid reduction gear that is compact in outer diameter size.

DESCRIPTION OF EMBODIMENTS

Hereinbelow, a cycloid reduction gear according to an embodiment of the present invention is described with reference to FIGS. 1 to 5.

Figure 1:
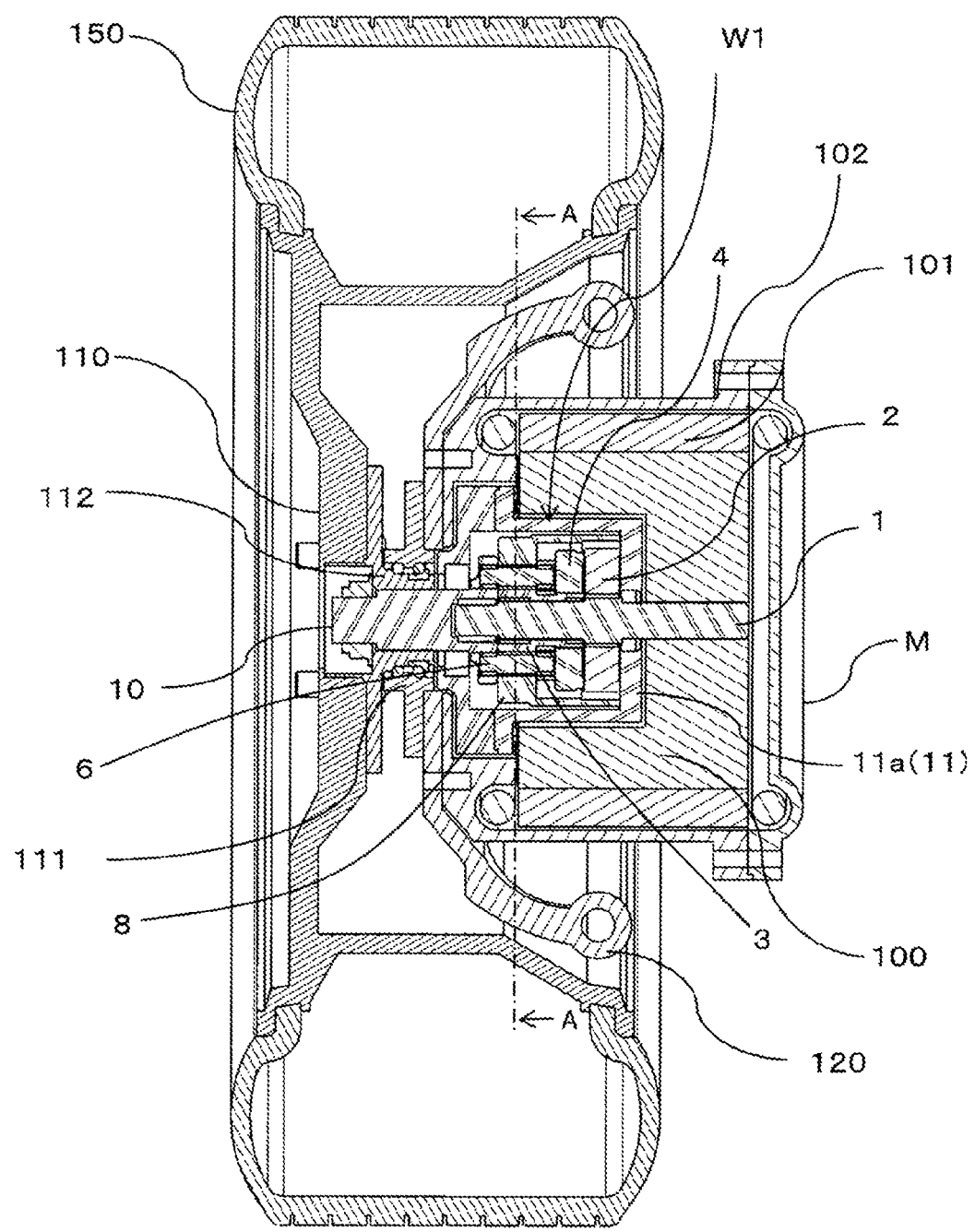
FIG. 1 is a schematic diagram for explaining the configuration of a reduction gear according to an embodiment of the present invention, and is a schematic diagram illustrating a cross section of connection portions between the reduction gear and a motor and between the reduction gear and a tire.
Figure 2:
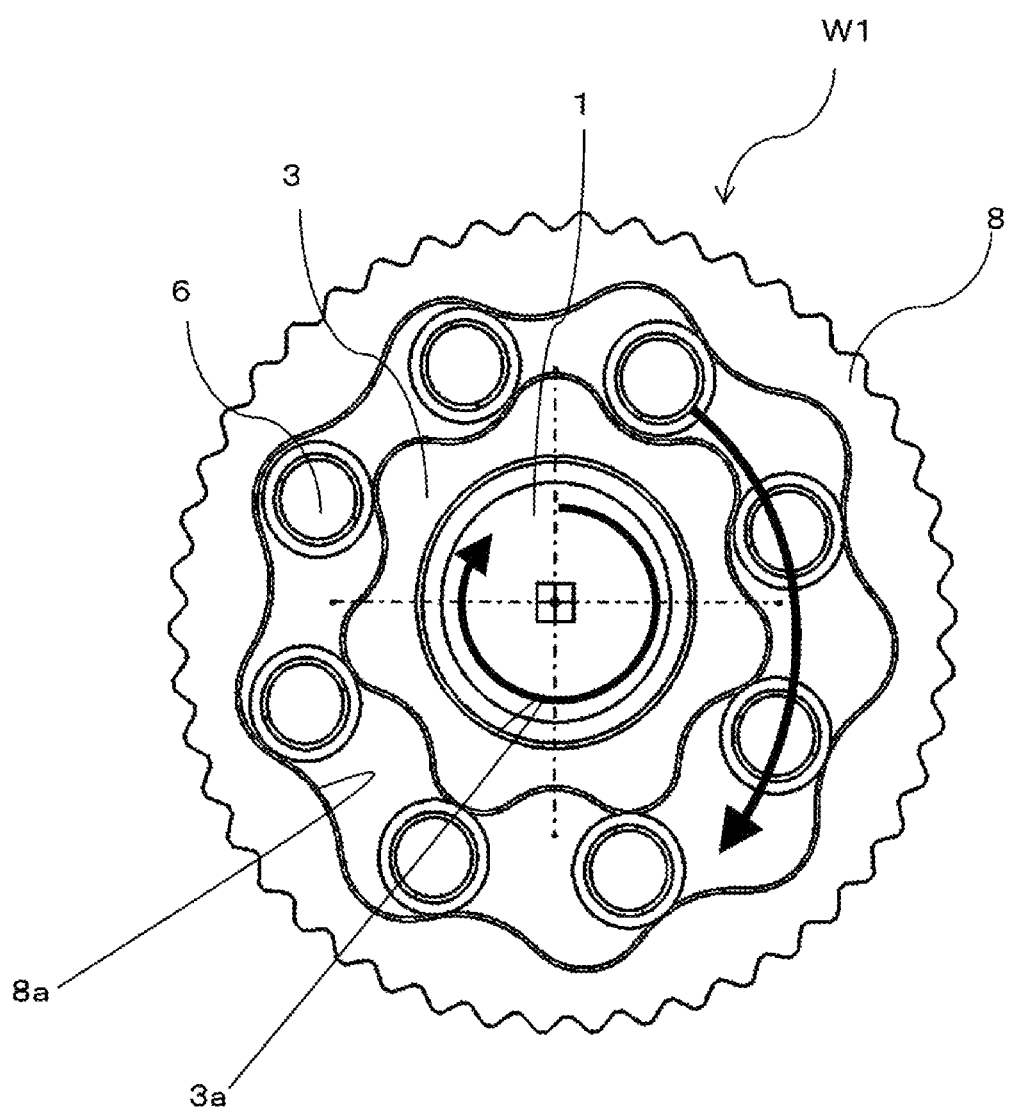
FIG. 2 is a schematic diagram illustrating a cross section taken along line A-A of FIG. 1.
Figure 3:
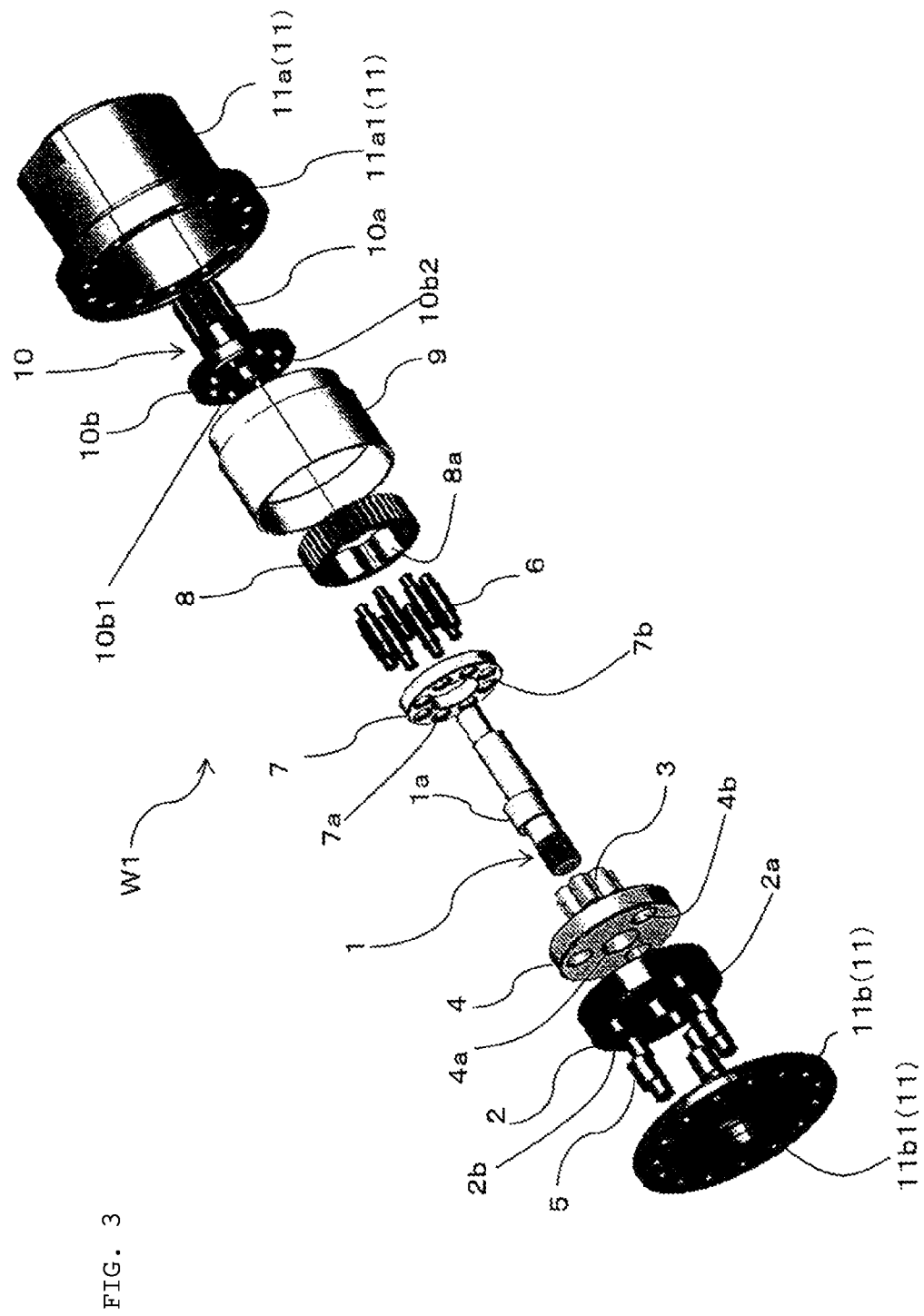
FIG. 3 is a part development view of the reduction gear according to the embodiment of the present invention.
Figure 4:
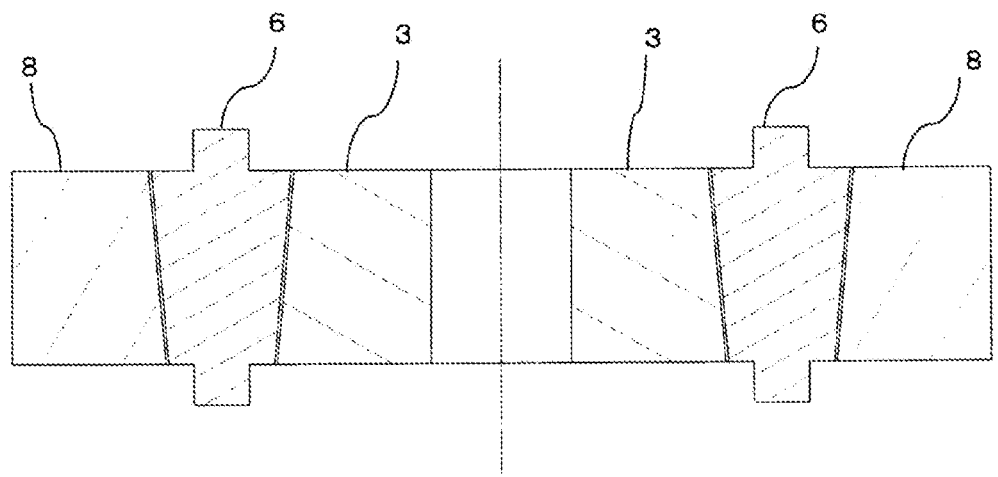
FIG. 4 is a schematic diagram illustrating the shape of contact portions between an inner trochoid and an output pin and between an outer trochoid and the output pin of the reduction gear according to the embodiment of the present invention.
Figure 5:
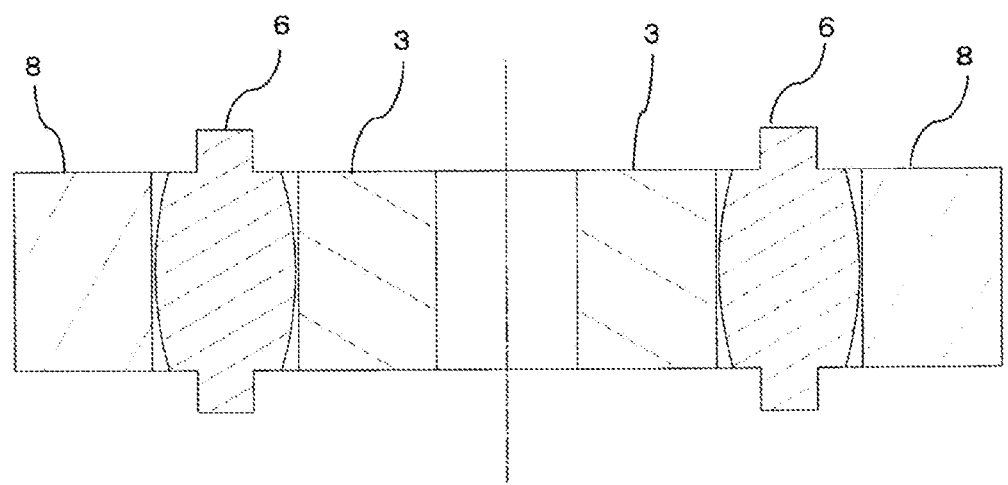
FIG. 5 is a schematic diagram illustrating another example of the shape of the contact portions between the inner trochoid and the output pin and between the outer trochoid and the output pin.

Note that, FIG. 1 is a schematic diagram for explaining the configuration of the reduction gear according to the embodiment of the present invention, and is a schematic diagram illustrating a cross section of connection portions between the reduction gear and a motor and between the reduction gear and a tire. FIG. 2 is a schematic diagram illustrating a cross section taken along line A-A of FIG. 1. FIG. 3 is a part development view of the cycloid reduction gear according to this embodiment. In addition, FIG. 4 is a schematic diagram illustrating the shape of contact portions between an inner trochoid and an output pin and between an outer trochoid and the output pin of the reduction gear according to this embodiment. FIG. 5 is a schematic diagram illustrating another example of the shape of the contact portions between the inner trochoid and the output pin and between the outer trochoid and the output pin of the reduction gear according to this embodiment.

<<Outline of Reduction Gear W1>>

First, the outline of a reduction gear W1 according to this embodiment is described with reference to FIG. 1 which illustrates the configuration of a wheel drive unit of a vehicle equipped with the reduction gear W1.

As illustrated in the drawing, the wheel drive unit of the vehicle equipped with the reduction gear W1 according to this embodiment includes: a motor M; the reduction gear W1 that is configured to reduce and output the rotation speed of the motor M; a hub 112 that is configured to transmit the output (rotation output) from the reduction gear W1 to a tire 150 and a wheel 110; and the wheel 110 and the tire 150 that are secured to the hub 112. Here, in the drawing, a part indicated by reference sign 120 is a knuckle, and a part indicated by reference sign 111 is a wheel bearing.

The motor M includes: a motor rotor (rotor) 100 that is configured to rotate an input shaft (rotary shaft) 1; a motor stator (stator) 101 that is configured to rotate the motor rotor; and a motor bracket 102 that houses the motor rotor 100 and the motor stator 101 therein. Here, the motor rotor 100 has a hole portion formed in its center and the input shaft 1 is inserted into this hole portion, so that the input shaft (rotary shaft) 1 is rotated along with the rotation of the motor stator 101.

Note that, in this embodiment, for the convenience of description, a description is given with an example in which the input shaft 1 is constituted as a shared part between the motor M and the reduction gear W1; however, the input shaft 1 may instead be constituted of a rotary shaft on the motor M side and an input shaft on the reduction gear side which is connected to the rotary shaft on the motor side.

In addition, the reduction gear W1 includes: the input shaft 1 that is rotated along with the rotation of the motor M; and an output shaft 10 that is provided for rotating a vehicle wheel (a vehicle wheel constituted of parts such as the hub 112, the wheel 110, and the tire 150).

The reduction gear W1 further includes: an eccentric portion 1a (see FIG. 3) that is provided in the input shaft 1; an inner trochoid 8 that has a substantially tubular shape penetrating at both ends thereof and has a wavy curved surface formed on its inner circumferential side surface; an inner trochoid holder 9 that is designed to hold the inner trochoid 8; an outer trochoid 3 that is disposed inside the tubular inner trochoid 8, has a substantially tubular shape penetrating at both ends thereof, and has a wavy curved surface formed on its outer circumferential side surface; a rotation restriction unit (an outer trochoid holder 4, crankshafts 5, a housing cover 11b) that is designed to restrict the rotation of the outer trochoid 3 around its axis; and multiple output pins 6 that are pinched between the outer circumferential side surface of the outer trochoid 3 and the inner circumferential side surface of the inner trochoid 8. Besides, the multiple output pins 6 have one ends secured to the output shaft 10.

In addition, the above outer trochoid 3 is connected to the eccentric portion 1a of the input shaft 1. When the input shaft 1 rotates, the outer trochoid receives eccentric input from the input shaft 1 and at the same time its rotation around its axis is restricted by the above rotation restriction unit, which makes the outer trochoid only revolve around an axis of rotation of the input shaft 1.

Meanwhile, when the input shaft 1 rotates, the inner trochoid holder 9 transmits the eccentric input generated by the rotation of the input shaft to the inner trochoid 8 to make the inner trochoid 8 revolve around the axis of rotation of the input shaft 1 and at the same time to make the inner trochoid 8 rotate around its axis in the same direction as the direction of rotation of the input shaft 1.

Meanwhile, in response to the outer trochoid 3's revolution around the axis of rotation of the input shaft and the inner trochoid 8's revolution around the axis of rotation of the input shaft and rotation around its axis, the above output pins 6 are made to revolve around the axis of rotation of the input shaft 1 in the same direction as the direction of rotation of the input shaft 1 while being pinched between the outer trochoid 3 and the inner trochoid 8, to thereby rotate the output shaft 10 in the same direction as the direction of rotation of the input shaft 1.

Further, the hub 112 that is designed to hold the wheel 110 and the tire 150 is secured to an outer circumferential side surface on one end side of the output shaft 10 of the reduction gear W1. With this configuration, the rotation of the input shaft 1 that is rotated along with the rotation of the motor M rotates the output shaft 10 with its speed reduced by the reduction gear W1, and thus rotates the wheel 110 and the tire 150 through the hub 112.

In this way, both the outer trochoid 3 and the inner trochoid 8 are designed to operate in the reduction gear W1 of this embodiment. With this configuration, the "outer pins and inner pins" that are essential for the cycloid reduction gear of the existing technique can be replaced simply by the output pins 6 (the output pins 6 can also function as the "outer pins and inner pins" of the existing technique), thereby implementing a reduction in size of the reduction gear as compared to that of the existing technique.

In addition, due to such a configuration that both the outer trochoid 3 and the inner trochoid 8 are designed to operate, the reduction gear W1 of this embodiment can achieve a larger meshing ratio than the cycloid reduction gear of the existing technique, thus implementing smoother driving.

Note that, this embodiment is characteristic in the configuration of the reduction gear W1 and the known technique is used for the rest of configurations (the configurations of the parts such as the motor M, the hub 112, the tire 150, and the wheel 110). For this reason, hereinbelow, the reduction gear W1 is described in detail and the rest of configurations are not described.

<<Regarding Component of Reduction Gear W1>>

The components of the reduction gear W1 are described with reference to FIGS. 1 to 4.

As illustrated in FIG. 3, the reduction gear W1 includes: the input shaft 1; a counterweight 2; the outer trochoid part (outer trochoid) 3; the outer trochoid flange 4; the crankshafts 5; the output pins 6; a plate 7 that is designed to hold the output pins 6; the inner trochoid part (inner trochoid) 8; the inner trochoid holder 9; the output shaft 10; and a housing 11.

The input shaft 1 is formed to have the shape of a substantially columnar bar, and has a lower portion that is inserted into and secured to the motor rotor 100 of the motor M and an upper portion that protrudes from the motor rotor 100 and is housed inside the housing 11 (see FIG. 1).

In addition, the eccentric portion 1a that is eccentric to the axis of rotation of the input shaft 1 is provided in the input shaft 1 at the upper portion that is housed inside the housing 11.

The input shaft 1 is also inserted into a through hole 3a (see FIG. 2) that is formed in a central portion of the outer trochoid 3, and supports the outer trochoid 3 through a bearing (not illustrated in FIG. 3) (the input shaft 1 is connected to the outer trochoid 3 through the bearing) at the position of the eccentric portion 1a.

The input shaft 1 is further inserted into a through hole 2a that is formed in the counterweight 2 supporting the inner trochoid holder 9, and supports the counterweight 2 through a bearing (not illustrated in FIG. 3) at a position lower than the position at which the input shaft supports the outer trochoid 3.

The counterweight 2 functions as a weight that is configured to keep a balance between the inner trochoid holder 9 and the inner trochoid 8.

This counterweight 2 is formed to have the shape of a substantially circular plate, and the through hole 2a penetrating its both end surfaces is formed in a central portion of the counterweight. As described previously, the input shaft 1 is inserted into this through hole 2a, and the counterweight 2 is supported by the eccentric portion 1a of the input shaft 1 through the bearing that is provided to the through hole 2a. In other words, the counterweight 2 is connected to the input shaft 1 through the bearing. With this configuration, the counterweight 2 receives eccentric input from the input shaft 1.

In addition, multiple through holes 2b into which the crankshafts 5 are inserted are provided in the counterweight 2 at a position around the through hole 2a. In the example illustrated in the drawing, three through holes 2b are arranged in the counterweight 2 at equal intervals in its circumferential direction.

The outer trochoid 3 is designed to rotate, along with the rotation of the input shaft 1, revolve around the axis of rotation of the input shaft 1 in the same direction as the direction of rotation of the input shaft 1, and hold the output pins 6 together with the inner trochoid 8 to drive the output pins 6 (see FIG. 2).

The above outer trochoid 3 is formed to have a substantially cylindrical shape having the through hole 3a (see FIG. 2) that penetrates central portions of its both end surfaces. The input shaft 1 is inserted into this through hole 3a, and the outer trochoid 3 is supported by the eccentric portion 1a of the input shaft 1 through the bearing that is provided to the through hole 3a. With this configuration, the outer trochoid 3 receives eccentric input from the input shaft 1.

In addition, the outer trochoid 3 has the wavy curved surface formed on its outer circumferential side surface. In this embodiment, n−1(n≥4) arc-shaped waveforms (arc-shaped lobes) are provided in the wavy curved surface on the outer circumferential surface of the outer trochoid 3. In the example illustrated in the drawing, seven arc-shaped waveforms (arc-shaped lobes) are provided in the wavy curved surface on the outer circumferential surface of the outer trochoid 3.

Further, the outer trochoid flange 4 having a larger diameter than the outer trochoid 3 is provided to the outer trochoid 3 on its one end surface. This outer trochoid flange 4, as well as the "crankshafts 5 and housing cover 11b" to be described later, are parts designed to restrict the rotation of the outer trochoid around its axis. These outer trochoid flange 4, crankshafts 5, and housing cover 11b serve as the rotation restriction unit, and this rotation restriction unit makes the outer trochoid 3 only revolve around the axis of rotation of the input shaft without rotating around its axis.

Specifically, the outer trochoid flange 4 is the part that connects the crankshafts 5 and the outer trochoid 3 to each other for the purpose of making the outer trochoid 3 only revolve around the axis of rotation of the input shaft without rotating around its axis, and is formed on the one end surface of the outer trochoid 3. The outer trochoid flange 4 may be formed as an integral part with the outer trochoid 3, or alternatively may be provided as a part separate from the outer trochoid 3 and secured and mounted to the one end surface of the outer trochoid 3.

The above outer trochoid flange 4 is formed to have the shape of a substantially circular plate, and a through hole 4a penetrating its both end surfaces is formed in a central portion of the outer trochoid flange. This through hole 4a has the same diameter as the through hole 3a of the outer trochoid 3 and the through hole 2a of the counterweight 2.

In addition, one side of the outer trochoid flange 4 is in contact with the one end surface of the outer trochoid 3 (or is formed integrally with the one end surface of the outer trochoid 3), and the other side is in contact with the counterweight 2. Moreover, the through hole 4a of the outer trochoid flange 4 communicates with the through hole 3a of the outer trochoid 3 and the through hole 2a of the counterweight 2. Besides, the input shaft 1 is inserted into this through hole 4a, and the outer trochoid 3 is supported by the eccentric portion 1a of the input shaft 1 through the bearing (not illustrated in the drawings) provided to the through hole 4a.

Further, multiple through holes 4b into which the crankshafts 5 are inserted are provided in the outer trochoid flange 4 at a position around the through hole 4a. In the example illustrated in the drawing, three through holes 4b are arranged in the outer trochoid flange 4 at equal intervals in its circumferential direction.

The crankshafts 5 are the parts that are provided for the purpose of making the outer trochoid 3 only revolve around the axis of rotation of the input shaft 1 while preventing the outer trochoid 3 from rotating around its axis in response to eccentric input from the input shaft. The crankshafts are inserted into the through holes 2b of the counterweight 2 and the through holes 4b of the outer trochoid flange 4, and have one ends secured to the housing 11 (a housing cover 11b of the housing 11).

In this embodiment, three crankshafts 5 are provided.

The output pins 6 are the parts that are each formed to have the shape of a substantially columnar bar, and are provided for the purpose of outputting the driving force to the output shaft 10 while being pinched between the outer circumferential side surface of the outer trochoid 3 and the inner circumferential side surface of the inner trochoid 8. In this embodiment, n output pins 6 are arranged at equal intervals on the same circumference while being pinched between the outer circumferential side surface of the outer trochoid 3 and the inner circumferential side surface of the inner trochoid 8. In the example illustrated in the drawing, eight output pins 6 are provided.

The plate 7 is the part that is designed to hold the output pins 6. This plate 7 is formed to have the shape of a substantially circular plate, and a through hole 7a into which the input shaft 1 is inserted is formed in a central portion of the plate. In addition, n (n=8) through holes 7b into which the output pins 6 are inserted are formed in the plate 7 at a position around the through hole 7a.

The inner trochoid 8 is designed to rotate, along with the rotation of the input shaft 1, revolve around the axis of rotation of the input shaft 1 in the same direction as the direction of rotation of the input shaft 1 and at the same time around its axis in the same direction as the direction of rotation of the input shaft 1, and hold the output pins 6 together with the outer trochoid 3 to drive the output pins 6 (see FIG. 2).

The above inner trochoid 8 is formed to have a substantially cylindrical shape having a through hole 8a that penetrates central portions of its both end surfaces.

In addition, the inner trochoid 8 has the wavy curved surface formed on its inner circumferential side surface. In this embodiment, n+1 arc-shaped waveforms (arc-shaped lobes) are provided in the wavy curved surface on the inner circumferential side surface of the inner trochoid 8. In the example illustrated in the drawing, nine arc-shaped waveforms are provided in the wavy curved surface on the inner circumferential side surface of the inner trochoid 8.

Further, male splines are formed in an outer circumferential side surface of the inner trochoid 8, and these male splines are spline-fitted to female splines (not illustrated in the drawings) formed in an inner circumferential side surface of the inner trochoid holder 9 to be described below. Thereby, the inner trochoid 8 is held while being secured to the inner circumferential side surface of the inner trochoid holder 9.

Here, the through hole 8a of the inner trochoid 8 is formed to have a larger diameter by a predetermined size than the outer diameter of the outer trochoid 3.

In addition, when the outer trochoid 3 is inserted into the through hole 8a (into the tube) of the inner trochoid 8 and disposed at a predetermined position, a clearance with a dimension allowing insertion of the output pins 6 is formed between the "wavy curved surface with (n+1) waveforms" formed on the inner circumferential side surface of the inner trochoid 8 and the "wavy curved surface with (n−1) waveforms" formed on the outer circumferential side surface of the outer trochoid 3. By inserting the n output pins 6 into this clearance, the n output pins 6 are pinched between the outer circumferential side surface of the outer trochoid 3 and the inner circumferential side surface of the inner trochoid 8.

The inner trochoid holder 9 is the part that is formed to have a substantially cylindrical shape penetrating at both ends thereof and designed to hold the inner trochoid 8. As is to be described later, when the input shaft 1 rotates, the inner trochoid holder 9 receives eccentric input from the input shaft 1 through the counterweight 2, and transmits the eccentric input to the inner trochoid 8 to make the inner trochoid 8 revolve around the axis of rotation of the input shaft 1 and at the same time to make the inner trochoid 8 rotate around its axis in the same direction as the direction of rotation of the input shaft 1.

Specifically, the inner trochoid holder 9 is supported by an outer circumferential side surface of the counterweight 2 through a bearing (not illustrated in the drawings) at a position on one end side of the inner circumferential side surface of the inner trochoid holder (a "first position" for the convenience of description). In other words, the inner circumferential side surface of the inner trochoid holder 9 is connected to the outer circumferential side surface of the counterweight 2 through the bearing.

Here, the counterweight 2 is connected to the crankshafts 5 that are supported by the housing cover 11b to be described later, and thus can only revolve around the axis of rotation of the input shaft while its rotation around its axis is restricted by the housing cover 11b.

In addition, the female splines (not illustrated in the drawings) are formed in the inner trochoid holder 9 at a position closer to the other end side by a predetermined dimension than the first position of the inner circumferential side surface of the inner trochoid holder (a "second position" for the convenience of description), and the male splines in the outer circumferential side surface of the inner trochoid 8 are spline-fitted to these female splines. In other words, the inner trochoid holder 9 supports, at its inner circumferential side surface, the inner trochoid 8 in an immovable way.

With the above configuration, upon receiving eccentric input from the input shaft 1 through the counterweight 2, the inner trochoid holder 9 revolves around the axis of rotation of the input shaft 1 in the direction of rotation of the input shaft 1 and at the same time rotates around its axis in the same direction as the direction of rotation of the input shaft 1.

Then, when the inner trochoid holder 9 revolves around the axis of rotation of the input shaft 1 along with the rotation of the input shaft, the inner trochoid 8 that is spline-fitted to the inner trochoid holder 9 revolves around the axis of rotation of the input shaft together with the inner trochoid holder 9 and at the same time rotates around its axis in the same direction as the direction of rotation of the input shaft 1.

The output shaft 10 includes: a shaft portion 10a that has the shape of a substantially columnar bar; and a flange portion 10b that is formed at one end of the shaft portion 10a. The flange portion 10b is formed to have the shape of a substantially circular plate having a larger diameter than the shaft portion 10a. A through hole 10b1 into which the input shaft 1 is inserted is formed in a central portion of the flange portion, and n through holes 10b2 into which the output pins 6 are inserted and secured are formed around the through hole 10b1.

Specifically, the input shaft 1 is inserted into the through hole 10b1 provided in the central portion of the flange portion 10b, and the input shaft 1 is supported by a bearing (not illustrated in the drawings) provided to the through hole 10b1. In addition, one end side of each output pin 6 is inserted into and secured to the corresponding through hole 10b2 formed in the circumference of the flange portion 10b. With this configuration, the output shaft 10 is rotated along with the rotation of the output pins 6 (see FIG. 2).

Here, an outer circumferential side surface of the shaft portion 10a of the output shaft 10 is secured to the hub 112, whereby the rotation of the output shaft 10 is transmitted to the hub 112 to rotate the hub 112.

The housing 11 is the part that is designed to hold and protect the components of the reduction gear W1, and includes: a substantially cylindrical main body portion 11a; and the housing cover 11b having the shape of a substantially circular plate.

The main body portion 11a is formed to have the shape of a hollow cylinder that is open on both upper and lower ends, and houses therein "an upper portion of the input shaft 1, the counterweight 2, the outer trochoid 3, the outer trochoid flange 4, the crankshafts 5, the output pins 6, the plate 7, the inner trochoid 8, and the inner trochoid holder 9". In addition, a flange portion 11a1 is formed on the other end surface (lower surface) of the main body portion 11a, and the housing cover 11b is placed on this flange portion 11a1. Here, the main body portion 11a is secured to the motor M.

Meanwhile, the housing cover 11b is the part that is designed to cover the other end surface (lower surface) of the main body portion 11a, and a through hole 11b1 into which the input shaft 1 is inserted is formed in its central portion having the shape of a substantially circular plate. The input shaft 1 is inserted into the through hole 11b1 of the housing cover 11b, and the input shaft 1 is supported by a bearing (not illustrated in the drawings) provided in the through hole 11b1.

In addition, crankshaft support portions that are designed to support the one ends of the crankshafts 5 are provided in the housing cover 11b at a position around the through hole 11b1, which makes the parts connected to the crankshafts 5 (the counterweight 2 and the outer trochoid flange 4) only revolve around the axis of rotation of the input shaft while restricting their rotation around their axes.

Meanwhile, in this embodiment, as illustrated in FIG. 4, the inner circumferential side surface of the inner trochoid 8 and the outer circumferential side surface of the outer trochoid 3 are each formed to have a tapered shape. In addition, the output pins 6, which are pinched between the inner circumferential side surface of the inner trochoid 8 and the outer circumferential side surface of the outer trochoid 3, are each formed to have a tapered shape such that its outer circumferential side surface extends along the inner circumferential side surface of the inner trochoid 8 and the outer circumferential side surface of the outer trochoid 3.

Specifically, the inner circumferential side surface of the inner trochoid 8 is formed to have a tapered shape extending radially inward from its one end surface (its upper end surface in the drawing) toward the other end surface (its lower end surface in the drawing), whereas the outer circumferential side surface of the outer trochoid 3 is formed to have a tapered shape extending radially outward from its one end surface (its upper end surface in the drawing) toward the other end surface (its lower end surface in the drawing). In addition, the output pins 6 each have a tapered shape such that its portion in contact with the trochoid parts (the outer trochoid 3 and the inner trochoid 8) gradually decreases in diameter from its one side (its upper side in the drawing) toward the other side (its lower side in the drawing).

In other words, the wavy curved surface on the inner circumferential side surface of the inner trochoid 8 has a tapered shape tapered in the opposite direction to that of the wavy curved surface on the outer circumferential side surface of the outer trochoid 3. In addition, the output pins 6 each have a tapered shape such that its portion in contact with the trochoid parts (the outer trochoid 3 and the inner trochoid 8) is fitted to the above tapered shapes of the inner trochoid 8 and the outer trochoid 3. Thereby, backlash is adjusted.

Meanwhile, instead of the configuration of FIG. 4 described above, the inner trochoid 8, the output pins 6, and the outer trochoid 3 may have shapes illustrated in FIG. 5.

In the example illustrated in FIG. 5, the output pins 6 each have a crowning formed in a portion in contact with the trochoid parts (the outer trochoid 3 and the inner trochoid 8), and have a substantially barrel-like shape. Here, in the example illustrated in the drawing, the inner circumferential side surface of the inner trochoid 8 is perpendicular to its both end surfaces (its both upper and lower end surfaces in the drawing). In addition, the outer circumferential side surface of the outer trochoid 3 is perpendicular to its both end surfaces (its both upper and lower end surfaces in the drawing).

This configuration prevents each output pin 6 from wearing at both ends of its contact surface with the trochoid parts (the inner trochoid and the outer trochoid).

Note that, the wavy curved surface on the outer circumferential side surface of the outer trochoid 3 and the wavy curved surface on the inner circumferential side surface of the inner trochoid 8 of the reduction gear W1 of this embodiment are designed as follows, for example.

We define an outer trochoidal curve that a moving circle rolling on the outside of a fixed circle draws and an inner trochoidal curve that a moving circle rolling on the inside of the fixed circle draws, and shared pins (output pins 6) that roll on the outer trochoidal curve and the inner trochoidal curve. Assuming that there are n shared pins, the shapes of pin rolling planes constituted of the outer trochoidal curve with (n−1) lobes and the inner trochoidal curve with (n+1) lobes are defined.

In addition, the pins (output pins 6) shared by the outer trochoidal curve and the inner trochoidal curve are equally distributed on a specific circumference with respect to the central axis of each trochoidal curve that circles in an eccentric manner. The pin rolling planes differ depending on the amount of eccentricity and the diameter of each pin, and are curved planes offset from the trochoidal curves by the amount of radius of each pin (output pin 6). The offset is performed by plotting the radius of each pin (output pin 6) in a direction normal to each trochoidal curve (inward for the outer trochoid and outward for the inner trochoid).

<<Operation of Reduction Gear W1>>

Next, the operation of the reduction gear W1 is described.

When the motor M is driven to rotate the input shaft 1, along with the rotation of the input shaft 1, the counterweight 2 receives eccentric input from the eccentric portion 1a of the input shaft 1, and revolves around the axis of rotation of the input shaft 1 in the same direction as the direction of rotation of the input shaft 1. Here, the counterweight 2 is connected to the crankshafts 5 that are supported by the housing cover 11b, and thus can only revolve around the axis of rotation of the input shaft while its rotation around its axis is restricted by the housing cover 11b and the crankshafts 5.

In addition, when the counterweight 2 revolves around the axis of rotation of the input shaft, the inner trochoid holder 9, which is supported by the outer circumferential side surface of the counterweight 2 through the bearing, revolves around the axis of rotation of the input shaft 1 in the same direction as the axis of rotation of the input shaft 1 and at the same time rotates around its axis in the direction of rotation of the input shaft 1.

Further, the inner trochoid 8, which is spline-fitted to the inner circumferential side surface of the inner trochoid holder 9, also revolves around the axis of rotation of the input shaft 1 in the same direction as the axis of rotation of the input shaft 1 and at the same time rotates around its axis in the direction of rotation of the input shaft 1 as in the case of the inner trochoid holder 9.

Meanwhile, the outer trochoid 3 is supported by the eccentric portion 1*a* of the input shaft 1 through the bearing of the through hole 3*a*. When the input shaft 1 rotates, the outer trochoid 3 receives eccentric input from the input shaft 1, and revolves around the axis of rotation of the input shaft 1 in the same direction as the direction of rotation of the input shaft 1.

In addition, the outer trochoid flange 4 is provided to the outer trochoid 3 on its one end surface. This outer trochoid flange 4 is connected to the crankshafts 5 that are supported by the housing cover 11*b*, and thus can only revolve around the axis of rotation of the input shaft while its rotation around its axis is restricted by the housing cover 11*b* and the crankshafts 5. Thereby, the outer trochoid 3 only revolves around the axis of rotation of the input shaft while its rotation around its axis is restricted by the outer trochoid flange 4.

Meanwhile, the n output pins 6 are pinched between: the outer circumferential side surface (the wavy curved surface with (n−1) lobes) of the outer trochoid 3 that only revolves around the axis of rotation of the input shaft 1 in the same direction as the direction of rotation of the input shaft 1 in response to eccentric input from the input shaft 1; and the inner circumferential side surface (the wavy curved surface with (n+1) lobes) of the inner trochoid 8 that revolves around the axis of rotation of the input shaft 1 in the same direction as the direction of rotation of the input shaft and at the same time rotates around its axis in the same direction as the direction of rotation of the input shaft 1 in response to eccentric input from the input shaft 1.

In response to "the rotation of the outer trochoid 3 around the axis of rotation of the input shaft" and "the rotation of the inner trochoid 8 around the axis of rotation of the input shaft and around its axis", the n output pins 6 revolve around the axis of rotation of the input shaft 1 in the same direction as the direction of rotation of the input shaft 1 while being pinched between the outer trochoid 3 and the inner trochoid 8 (see FIG. 2).

Meanwhile, the n output pins 6 are inserted and secured at their ends to the flange portion 10*b* of the output shaft 10. Thereby, when the n output pins 6 revolve around the axis of rotation of the input shaft 1, the output shaft 10 rotates around the axis of rotation of the input shaft 1 in the same direction as the rotation of the input shaft 1.

Here, when the output shaft 10 rotates, the hub 112 secured to the output shaft 10 rotates to drive the wheel 110 and the tire 150 to rotate accordingly.

As has been described above, both the outer trochoid 3 and the inner trochoid 8 are designed to operate in the reduction gear W1 of this embodiment. With this configuration, the "outer pins and inner pins" that are essential for the cycloid reduction gear of the existing technique can be replaced simply by the output pins (outer pins) 6 (the output pins 6 can also function as the "outer pins and inner pins" of the existing technique), thereby implementing a reduction in outer diameter size of the reduction gear as compared to that of the existing technique. In other words, according to this embodiment, it is possible to provide the reduction gear W1 which is more compact in size than the cycloid reduction gear of the existing technique.

In addition, due to such a configuration that both the outer trochoid 3 and the inner trochoid 8 are designed to operate, the reduction gear W1 of this embodiment can achieve a larger meshing ratio than the cycloid reduction gear of the existing technique, thus implementing smoother driving.

The reduction gear W1 of this embodiment is further provided with the rotation restriction unit (the outer trochoid holder 4, the crankshafts 5, and the housing cover 11*b*) that is designed to restrict the rotation of the outer trochoid 3 around its axis. In addition, in the reduction gear W1 of this embodiment, the inner trochoid holder 9 that holds the inner trochoid 8 functions to transmit the eccentric input generated by the rotation of the input shaft 1 to the inner trochoid 8 to make the inner trochoid 8 revolve around the axis of rotation of the input shaft 1 and at the same time to make the inner trochoid 8 rotate around its axis in the same direction as the direction of rotation of the input shaft 1. With this configuration, the outer trochoid 3 is made to only revolve around the axis of rotation of the input shaft 1 and the inner trochoid 8 is made to revolve around the axis of rotation of the input shaft 1 and at the same time rotate around its axis in the same direction as the direction of rotation of the input shaft 1.

According to this configuration, in response to the outer trochoid 3's revolution around the axis of rotation of the input shaft and the inner trochoid 8's revolution around the axis of rotation of the input shaft and rotation around its axis, the output pins 6 can be made to revolve around the axis of rotation of the input shaft 1 in the same direction as the direction of rotation of the input shaft 1 while being pinched between the outer trochoid 3 and the inner trochoid 8, to thereby rotate the output shaft 10 in the same direction as the direction of rotation of the input shaft 1.

Accordingly, in the case of using an input made from the output shaft 10 side, the direction of rotation of the outer trochoid 3 is the same as the direction of rotation of the input made from the output shaft 10 side, and thus the input shaft 1 also rotates in the same direction. In other words, the configuration of this embodiment enables an input from the output shaft 10 side, and is therefore effective in the case of performing regeneration of power such as in a drive system of an electric vehicle.

Note that, since the cycloid reduction gear of the existing technique described above has such a configuration that the direction of rotation of an input made to the input shaft is opposite to the direction of rotation of the output shaft, this reduction gear has a problem in that it results in extremely poor efficiency when an input is made from the output shaft side.

First Modification Example

Next, a first modification example of the first embodiment of the present invention is described with reference to FIGS. 6 and 7.

Figure 6:
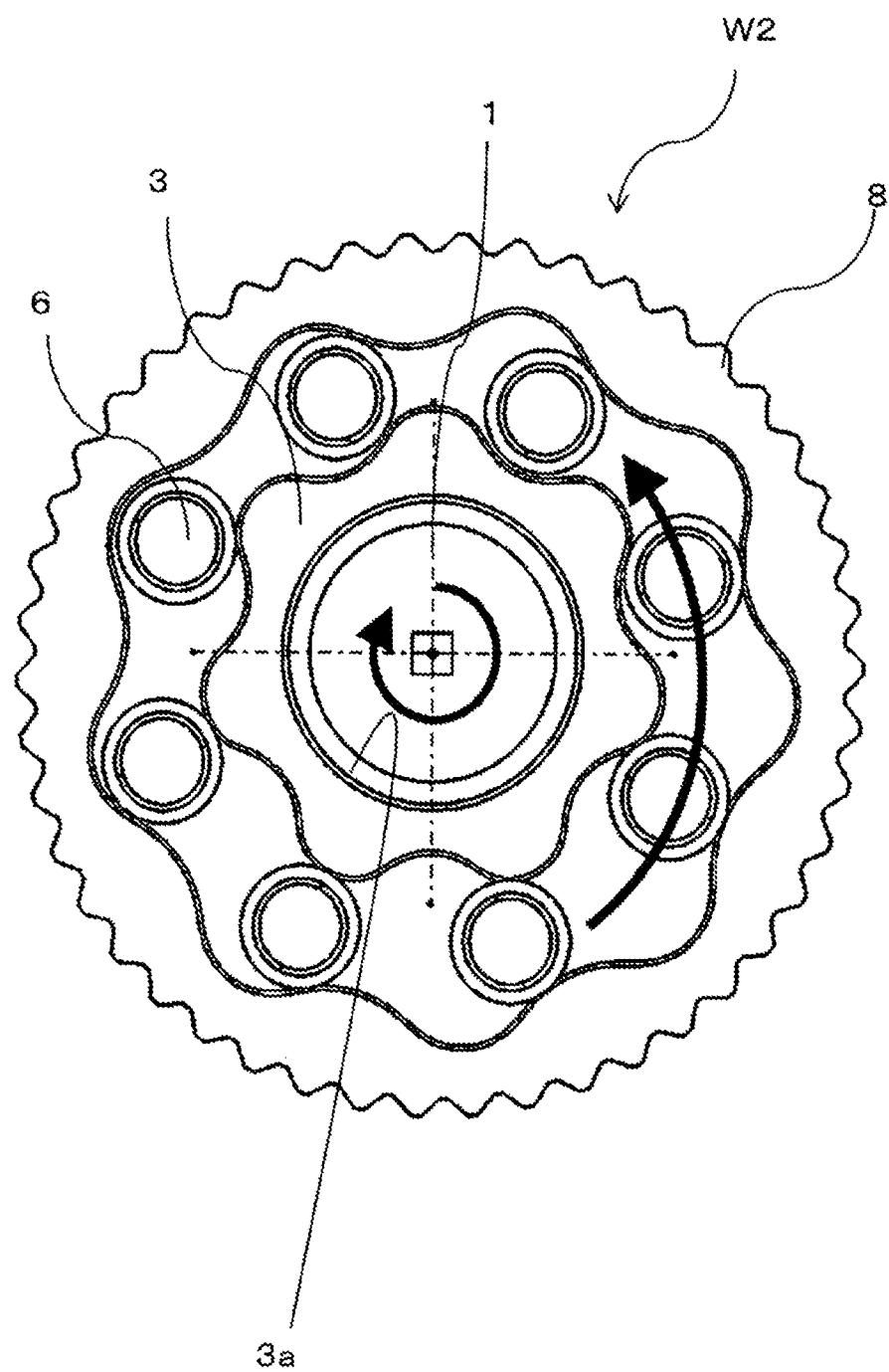
FIG. 6 is a schematic diagram illustrating a cross section of a reduction gear according to a first modification example of the embodiment of the present invention.

Here, FIG. 6 is a schematic diagram illustrating a cross section of a reduction gear according to the first modification example of this embodiment. FIG. 7 is a part development view of the reduction gear according to the first modification example of this embodiment.

Note that, in the first modification example, parts having the same configurations (or equivalent configurations) as those of the first embodiment described above are given the same reference signs and their description is omitted or simplified.

The first modification example of the first embodiment has such a configuration that the direction of rotation of an output made from the output shaft 10 is opposite to the direction of rotation of an input made to the input shaft 1 (see FIG. 6).

A reduction gear W2 of the first modification example employs such a configuration that no outer trochoid flange 4 employed in the first embodiment is provided in order to enable the outer trochoid 3 to rotate around its axis, and an inner trochoid holder 19 is provided with a rotation restriction unit that is designed to restrict the rotation of the inner trochoid 8 around its axis in order to make the inner trochoid only revolve around the axis of rotation of the input shaft.

<<Configuration of Reduction Gear W2 of First Modification Example>>

First, the configuration of the reduction gear W2 is described.

Figure 7:
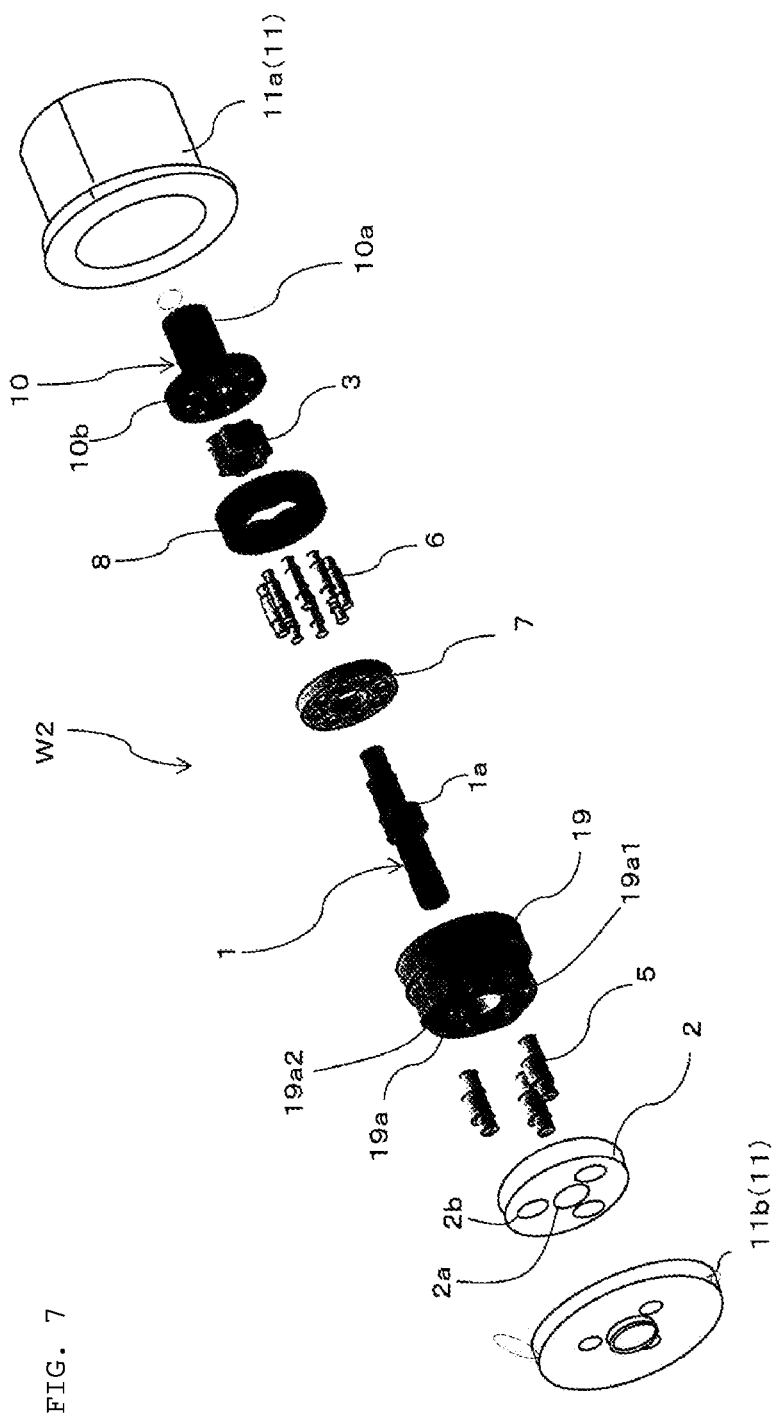
FIG. 7 is a part development view of the reduction gear according to the first modification example of the embodiment of the present invention.

As illustrated in FIG. 7, the reduction gear W2 of the first modification example includes: the input shaft 1; the counterweight 2; the outer trochoid 3; the crankshafts 5; the output pins 6; the plate 7; the inner trochoid 8; the inner trochoid holder 19; the output shaft 10; and the housing 11.

Hereinbelow, out of the configuration of the first modification example, only portions different from the first embodiment are described.

The outer trochoid 3 described above has the same configuration as that of the first embodiment. The outer trochoid has the through hole 3*a* which penetrates the central portions of its both end surfaces and into which the input shaft 1 is inserted, and is supported by the eccentric portion 1*a* of the input shaft 1 through the bearing that is provided to the through hole 3*a*. With this configuration, the outer trochoid 3 receives eccentric input from the input shaft 1.

Note that, in the first modification example, no outer trochoid flange 4 is provided to the outer trochoid 3 on its one end surface.

For this reason, in the first modification example, when the input shaft 1 rotates, in response to eccentric input from the input shaft 1, the outer trochoid 3 revolves around the axis of rotation of the input shaft in the same direction as the direction of rotation of the input shaft 1 and at the same time rotates around its axis in the opposite direction to the rotation of the input shaft 1.

Meanwhile, the inner trochoid holder 19 is formed to have a substantially cylindrical shape having a bottom surface 19*a* formed at its one end while being open at the other end, and a through hole 19*a*1 is formed in a central portion of the bottom surface 19*a*. In addition, through holes 19*a*2 are formed in the bottom surface 19*a* at a position around the through hole 19*a*1.

In addition, female splines (not illustrated in the drawings) are formed in an inner circumferential side surface of the inner trochoid holder 19 on the other end side thereof which is open, and the male splines on the outer circumferential side surface of the inner trochoid 8 are spline-fitted to these female splines. In other words, the inner trochoid holder 19 holds, at the inner circumferential side surface on the other end side thereof which is open, the inner trochoid 8 in an immovable way.

Further, the input shaft 1 is inserted into the through hole 19*a*1 of the bottom surface 19*a* of the inner trochoid holder 19, and the inner trochoid holder is connected to the eccentric portion 1*a* of the input shaft 1 through a bearing (not illustrated in the drawings) that is provided to the through hole 19*a*1. With this configuration, the inner trochoid holder 19 receives eccentric input from the input shaft 1.

Furthermore, the one ends of the crankshafts 5 are inserted into the through holes 19*a*2 of the bottom surface 19*a* of the inner trochoid holder 19. These crankshafts 5 are also inserted into the through holes 2*b* of the counterweight 2, and the other ends thereof are secured to the housing cover 11*b*.

With this configuration, when the input shaft 1 rotates, the inner trochoid holder 19 receives eccentric input from the input shaft 1 and at the same time its rotation around its axis is restricted by "the crankshafts 5 and the housing cover 11*b*", which makes the inner trochoid holder revolve around the axis of rotation of the input shaft 1 in the same direction as the direction of rotation of the input shaft 1 without rotating around its axis. Here, in the first modification example, "the bottom surface 19*a* of the trochoid holder 19, the crankshafts 5, and the housing cover" serve as the rotation restriction unit that is designed to restrict the rotation of the inner trochoid holder 19 around its axis.

Note that, in the first modification example, the counterweight 2 is provided between the inner trochoid holder 19 and the housing cover 11*b*. In order to keep a balance, by the action of the crankshafts 5, the counterweight 2 revolves around the axis of rotation of the input shaft 1 in the same direction as the direction of rotation of the input shaft in such a way that its phase differs from that of the inner trochoid holder 19 by 180 degrees.

<<Operation of Reduction Gear W2 of First Modification Example>>

Next, the operation of the reduction gear W2 is described.

When the motor M is driven to rotate the input shaft 1, along with the rotation of the input shaft 1, the counterweight 2 receives eccentric input from the eccentric portion 1*a* of the input shaft 1, and revolves around the axis of rotation of the input shaft 1 in the same direction as the direction of rotation of the input shaft 1.

Meanwhile, when the input shaft 1 rotates, the inner trochoid holder 19 receives eccentric input from the input shaft 1 and at the same time its rotation around its axis is restricted by "the crankshafts 5 and the housing cover 11*b*", which makes the inner trochoid holder only revolve around the axis of rotation of the input shaft 1 in the same direction as the direction of rotation of the input shaft 1 without rotating around its axis.

In addition, since the inner trochoid 8 is spline-fitted to the inner circumferential side surface of the inner trochoid holder 19, it only revolves around the axis of rotation of the input shaft 1 in the direction of rotation of the input shaft 1 as in the case of the inner trochoid holder 19.

Meanwhile, the outer trochoid 3 is supported by the eccentric portion 1*a* of the input shaft 1 through the bearing of the through hole 3*a*. When the input shaft 1 rotates, in response to eccentric input from the input shaft 1, the outer trochoid revolves around the axis of rotation of the input shaft 1 in the same direction as the direction of rotation of the input shaft 1 and at the same time rotates around its axis in the opposite direction to the rotation of the input shaft 1.

Meanwhile, the n output pins 6 are pinched between: the outer circumferential side surface (the wavy curved surface with (n−1) lobes) of the outer trochoid 3 that revolves around the axis of rotation of the input shaft 1 in the opposite direction to the direction of rotation of the input shaft 1 and at the same time rotates around its axis in the opposite direction to the rotation of the input shaft 1 in response to eccentric input from the input shaft 1; and the inner circumferential side surface (the wavy curved surface with (n+1)

lobes) of the inner trochoid 8 that only revolves around the axis of rotation of the input shaft 1 in response to eccentric input from the input shaft 1.

In response to "the rotation of the outer trochoid 3 around the axis of rotation of the input shaft and around its axis" and "the rotation of the inner trochoid 8 around the axis of rotation of the input shaft", the n output pins 6 revolve around the axis of rotation of the input shaft 1 in the opposite direction to the direction of rotation of the input shaft 1 while being pinched between the outer trochoid 3 and the inner trochoid 8 (see FIG. 6).

Meanwhile, the n output pins 6 are inserted and secured at their ends to the flange portion 10*b* of the output shaft 10. Thereby, when the n output pins 6 revolve around the axis of rotation of the input shaft 1 in the opposite direction to the rotation of the input shaft 1, the output shaft 10 rotates around the axis of rotation of the input shaft 1 in the opposite direction to the rotation of the input shaft 1 (see FIG. 6).

Here, when the output shaft 10 rotates, the hub 112 secured to the output shaft 10 rotates to drive the wheel 110 and the tire 150 to rotate accordingly.

As has been described above, both the outer trochoid 3 and the inner trochoid 8 are designed to operate in the reduction gear W2 of the first modification example of this embodiment. According to this configuration, as in the case of the first embodiment described above, the "outer pins and inner pins" that are essential for the cycloid reduction gear of the existing technique can be replaced simply by the output pins 6, thereby implementing a reduction in outer diameter size of the reduction gear as compared to that of the existing technique. In other words, according to the first modification example of this embodiment, it is possible to provide the reduction gear W2 which is more compact in size than the cycloid reduction gear of the existing technique.

In addition, due to such a configuration that both the outer trochoid 3 and the inner trochoid 8 are designed to operate, the reduction gear W2 of the first modification example can achieve a larger meshing ratio than the cycloid reduction gear of the existing technique, thus implementing smoother driving.

As has been described above, according to the embodiment and the first modification example of the present invention, it is possible to provide the reduction gears W1, W2 that are compact in outer diameter size, and that can achieve a larger meshing ratio than the cycloid reduction gear of the existing technique and therefore implement smoother driving.

Note that the present invention is not limited to the embodiment and the first modification example described above, and various modifications can be made thereto within the scope of the gist of the present invention.

Figure 8:
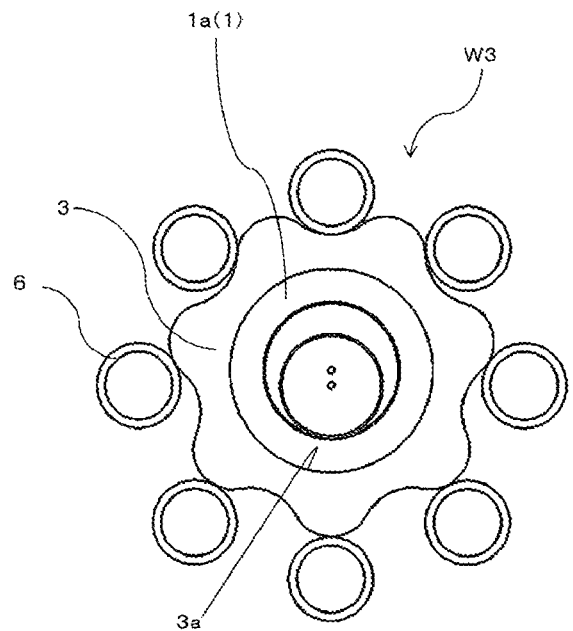
FIG. 8 is a schematic diagram illustrating a cross section of a second modification example of the reduction gear according to the embodiment of the present invention.

For example, as in a reduction gear W3 of a second modification example illustrated in FIG. 8, the reduction gear may have such a configuration that neither the inner trochoid 8 nor inner trochoid holder 9 is provided.

In this case, for example, the reduction gear W3 has a configuration including: the input shaft 1; the outer trochoid 3; the outer trochoid flange 4; the crankshafts 5; the output pins 6; the plate 7; the output shaft 10; and the housing 11.

Note that, in the second modification example, parts having the same configurations (or equivalent configurations) as those of the first embodiment and the first modification example are given the same reference signs and their description is omitted.

In the second modification example illustrated in FIG. 8, the outer trochoid 3 is supported by the eccentric portion 1*a* of the input shaft 1 through the bearing of the through hole 3*a*. When the input shaft 1 rotates, the outer trochoid 3 revolves around the axis of rotation of the input shaft 1 in the same direction as the rotation of the input shaft 1 in response to eccentric input from the input shaft 1.

Here, as in the embodiment described above, the outer trochoid flange 4 is provided to the outer trochoid 3 on its one end surface. This outer trochoid flange 4 is connected to the crankshafts 5 that are supported by the housing cover 11*b*, and thus can only revolve around the axis of rotation of the input shaft while its rotation around its axis is restricted by the housing cover 11*b* and the crankshafts 5. For this reason, the outer trochoid 3 only revolves around the axis of rotation of the input shaft while its rotation around its axis is restricted by the outer trochoid flange 4.

In addition, the output pins 6 are held by the plate 7 so as to be in contact with the outer circumferential side surface of the outer trochoid 3.

Further, the n output pins 6 revolve around the axis of rotation of the input shaft 1 in the same direction as the direction of rotation of the input shaft 1 while being in contact with the outer circumferential side surface (the wavy curved surface with (n−1) lobes) of the outer trochoid 3 that revolves around the axis of rotation of the input shaft 1 in the same direction as the direction of rotation of the input shaft 1 in response to eccentric input from the input shaft 1. Moreover, when the n output pins 6 revolve around the axis of rotation of the input shaft 1 in the same direction as the direction of rotation of the input shaft 1, the output shaft 10 rotates around the axis of rotation of the input shaft 1 in the same direction as the direction of rotation of the input shaft 1.

As in the case of the embodiment (and the first modification example) described above, this second modification example has such a configuration that the "outer pins and inner pins" that are essential for the cycloid reduction gear of the existing technique can be replaced simply by the output pins 6, thereby implementing a reduction in size of the reduction gear as compared to that of the existing technique.

Note that, since neither the inner trochoid 8 nor inner trochoid holder 9 is provided, the third modification example implements the reduction gear W3 that is smaller in size than those of the embodiment (and the first modification example) described above. In addition, this configuration implements a reduction in the number of parts as compared to those of the embodiment (and the first modification example) and thus implements a cost reduction.

Figure 9:
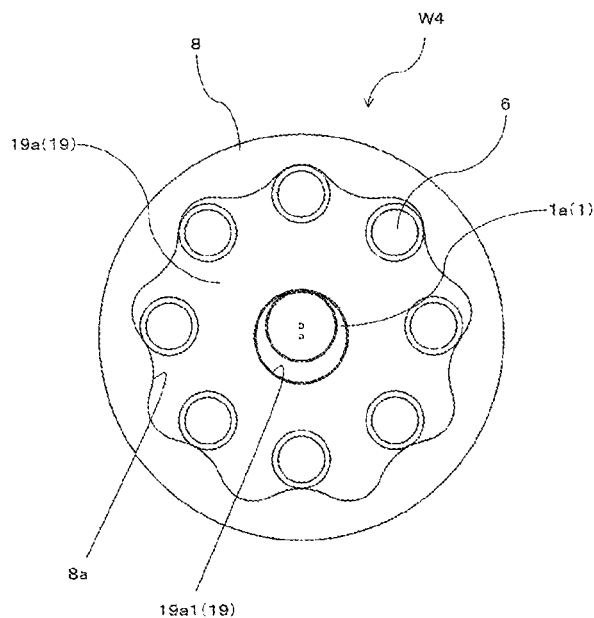
FIG. 9 is a schematic diagram illustrating a cross section of a third modification example of the reduction gear according to the embodiment of the present invention.

Alternatively, as in a reduction gear W4 of a third modification example illustrated in FIG. 9, the reduction gear may have such a configuration that no outer trochoid 3 is provided.

In this case, the reduction gear W4 has a configuration including: the input shaft 1; the crankshafts 5; the output pins 6; the plate 7; the inner trochoid 8; the inner trochoid holder 19; the output shaft 10; and the housing 11.

Note that, as in the case of the first modification example, when the input shaft 1 rotates, the inner trochoid holder 19 of the third modification example receives eccentric input from the input shaft 1 and at the same time its rotation around its axis is restricted by "the crankshafts 5 and the housing cover 11*b*", which makes the inner trochoid holder 19 revolve around the axis of rotation of the input shaft 1 in the same direction as the direction of rotation of the input shaft 1 without rotating around its axis.

In the third modification example illustrated in FIG. 9, the inner trochoid holder 19, which holds the inner trochoid 8 by being spline-fitted thereto, is supported at the through hole 19a1 of its bottom surface 19a by the eccentric portion 1a of the input shaft 1 through the bearing. When the input shaft 1 rotates, the inner trochoid holder 19 revolves around the axis of rotation of the input shaft 1 in the same direction as the rotation of the input shaft 1 in response to eccentric input from the input shaft 1.

In addition, when the input shaft 1 rotates, as in the case of the inner trochoid holder 19, the inner trochoid 8 that is held by the inner trochoid holder 19 also revolves around the axis of rotation of the input shaft 1 in the same direction as the rotation of the input shaft 1.

Moreover, the output pins 6 are held by the plate 7 so as to be in contact with the inner circumferential side surface of the inner trochoid 8.

Further, the n output pins 6 revolve around the axis of rotation of the input shaft 1 in the opposite direction to the direction of rotation of the input shaft 1 while being in contact with the inner circumferential side surface (the wavy curved surface with (n+1) lobes) of the inner trochoid 8 that revolves around the axis of rotation of the input shaft 1 in the same direction as the direction of rotation of the input shaft 1 in response to eccentric input from the input shaft 1. When the n output pins 6 revolve around the axis of rotation of the input shaft 1 in the opposite direction to the direction of rotation of the input shaft 1, the output shaft 10 rotates around the axis of rotation of the input shaft 1 in the opposite direction to the direction of rotation of the input shaft 1.

As in the case of the embodiment (and the first modification example) described above, the third modification example has such a configuration that the "outer pins and inner pins" that are essential for the cycloid reduction gear of the existing technique can be replaced simply by the output pins 6, thereby implementing a reduction in size of the reduction gear as compared to that of the existing technique.

In addition, this configuration implements a reduction in the number of parts as compared to those of the embodiment (the first embodiment and the first modification example) and thus implements a cost reduction.

Figure 10:
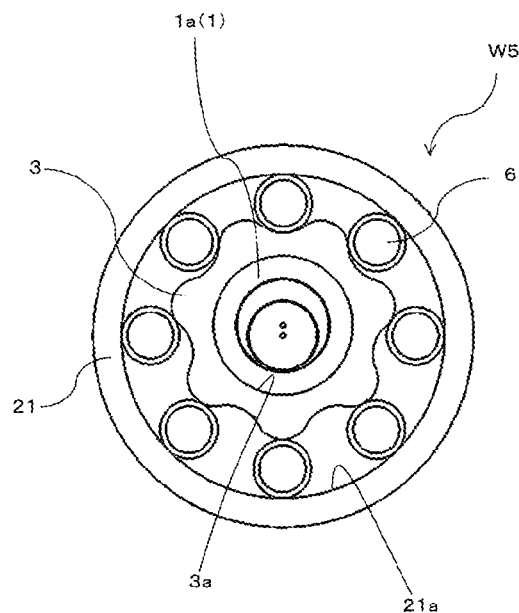
FIG. 10 is a schematic diagram illustrating a cross section of a fourth modification example of the reduction gear according to the embodiment of the present invention.

Meanwhile, the reduction gear may have a configuration as in a fourth modification example illustrated in FIG. 10, for example.

A reduction gear W5 of this fourth modification example has such a configuration that a ring-shaped part 21 that is designed to be in contact with the output pins 6 is provided to the reduction gear W3 of the second modification example at a position on one side of the output pins 6 opposite to the side where the outer trochoid 3 is in contact with the output pins.

Specifically, the reduction gear W5 of the fourth modification example illustrated in FIG. 10 includes: the input shaft 1; the outer trochoid 3; the outer trochoid flange 4; the crankshafts 5; the output pins 6; the plate 7; the output shaft 10; and the housing 11, and is further provided with the ring-shaped part 21.

This ring-shaped part 21 has a shape having a larger diameter than the outer trochoid 3. In addition, when the outer trochoid 3 is inserted into a hole portion 21a of the ring-shaped part 21 and disposed at a predetermined position, a clearance with a dimension allowing insertion of the output pins 6 is formed between an inner circumferential side surface of the ring-shaped part 21 and the outer circumferential side surface (the wavy curved surface with (n−1) waveforms) of the outer trochoid 3. By inserting the n output pins 6 into this clearance, the n output pins 6 are pinched between the inner circumferential side surface of the ring-shaped part 21 and the outer circumferential side surface of the outer trochoid 3.

The configuration of this fourth modification example can bring about the same operations and effects as those of the second modification example described above. In addition, the fourth modification example can act on the output pins 6, which are held by the outer trochoid 3 while being in contact with the outer circumferential side surface (the wavy curved surface) of the outer trochoid, in such a way as to prevent the output pins 6 being applied with a load from being deformed and prevent them from wearing due to reasons such as uneven loading.

Figure 11:
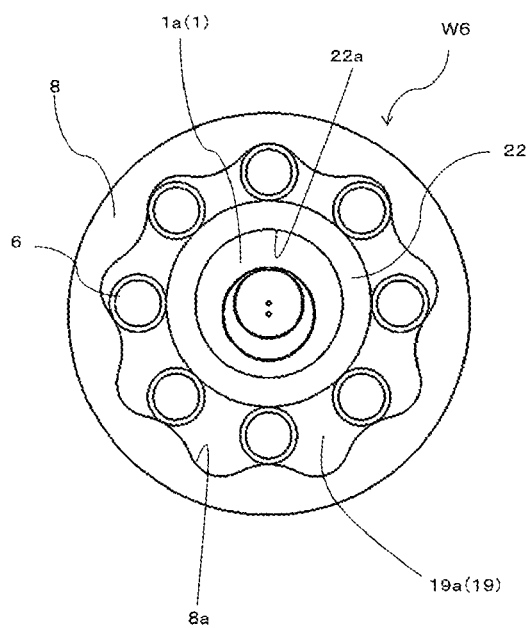
FIG. 11 is a schematic diagram illustrating a cross section of a fifth modification example of the reduction gear according to the embodiment of the present invention.

Meanwhile, the reduction gear may have a configuration as in a fifth modification example illustrated in FIG. 11, for example.

A reduction gear W6 of this fifth modification example has such a configuration that a ring-shaped part 22 that is designed to be in contact with the output pins 6 is provided to the reduction gear W4 of the third modification example at a position on one side of the output pins 6 opposite to the side where the inner trochoid 8 is in contact with the output pins.

Specifically, the reduction gear W6 of the fifth modification example illustrated in FIG. 11 includes: the input shaft 1; the crankshafts 5; the output pins 6; the plate 7; the inner trochoid 8; the inner trochoid holder 19; the output shaft 10; and the housing 11, and is further provided with the ring-shaped part 22 at a position on one side of the output pins 6 opposite to the side where the inner circumferential side surface of the inner trochoid 8 is in contact with the output pins.

This ring-shaped part 22 has a shape having a smaller diameter than the inner trochoid 8. In addition, the input shaft 1 is inserted into a hole portion 22a of the ring-shaped part 22, and the ring-shaped part 22 is supported by the input shaft 1 through a bearing (not illustrated in the drawing) provided to the hole portion 22a.

Further, when the ring-shaped part 22 is inserted into the through hole 8a (into the tube) of the inner trochoid 8 and disposed at a predetermined position, a clearance with a dimension allowing insertion of the output pins 6 is formed between the inner circumferential side surface (the wavy curved surface with (n+1) waveforms) of the inner trochoid 8 and an outer circumferential side surface of the ring-shaped part 22. By inserting the n output pins 6 into this clearance, the n output pins 6 are pinched between the inner circumferential side surface of the inner trochoid 8 and the outer circumferential side surface of the ring-shaped part 22.

The configuration of this fifth modification example can bring about the same operations and effects as those of the third modification example described above. In addition, the fifth modification example can act on the output pins 6, which are held by the inner trochoid 8 while being in contact with the inner circumferential side surface (the wavy curved surface) of the inner trochoid, in such a way as to prevent the output pins 6 being applied with a load from being deformed and prevent them from wearing due to reasons such as uneven loading.

W1, W2, W3, W4, W5, W6: reduction gear
1: input shaft
1a: eccentric portion
2: counterweight
2a, 2b: through hole
3: outer trochoid
3a: through hole
4: outer trochoid flange
4a, 4b: through hole 5: crankshaft
6: output pin
7: plate
7a, 7b: through hole
8: inner trochoid
8a: through hole
9: inner trochoid holder
10: output shaft
10a: shaft portion
10b: flange portion
10b1, 10b2: through hole
11: housing
11a: main body portion
11a1: flange portion
11b: housing cover
11b1: through hole
21: ring-shaped part
21a: hole portion
22: ring-shaped part
22a: hole portion
M: motor
100: motor rotor
101: motor stator
102: motor bracket
110: wheel
111: wheel bearing
112: hub
120: knuckle
150: tire

The invention claimed is:

1. A reduction gear that is configured to reduce a rotation speed input from an input shaft provided with an eccentric portion, and output the reduced rotation speed to an output shaft, the reduction gear comprising:

an outer trochoid that has a substantially tubular shape penetrating at both ends thereof and has a wavy curved surface formed on an outer circumferential side surface thereof;

a rotation restriction unit that is designed to restrict rotation of the outer trochoid around an axis thereof; and an output pin that is held by the outer trochoid while being in contact with the outer circumferential side surface of the outer trochoid, wherein the outer trochoid is connected to the eccentric portion of the input shaft and, when the input shaft rotates, the outer trochoid receives eccentric input from the input shaft and at the same time the rotation around the axis thereof is restricted by the rotation restriction unit, which makes the outer trochoid only revolve around an axis of rotation of the input shaft, and the output pin has one end secured to the output shaft and, in response to the outer trochoid's revolution around the axis of rotation of the input shaft, the output pin is made to revolve around the axis of the input shaft in the same direction as the direction of rotation of the input shaft while being in contact with the outer circumferential surface of the outer trochoid to thereby rotate the output shaft in the same direction as the direction of rotation of the input shaft, and wherein a ring-shaped part that is designed to be in contact with the output pin is provided at a position on one side of the output pin opposite to a side where the output pin is in contact with the outer circumferential side surface of the outer trochoid, and the output pin is pinched between the outer circumferential side surface of the outer trochoid and an inner circumferential side surface of the ring-shaped member.

* * * * *